Oct. 22, 1946.  J. A. MAPLES  2,409,776
JIG FOR TRIMMING BOILER TUBES
Filed Oct. 18, 1943
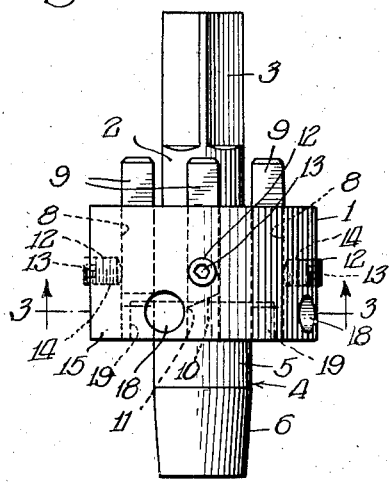
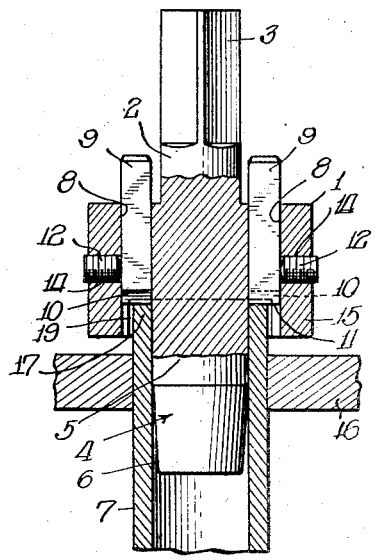
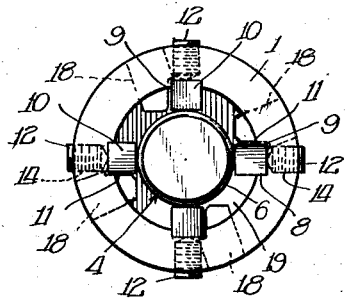
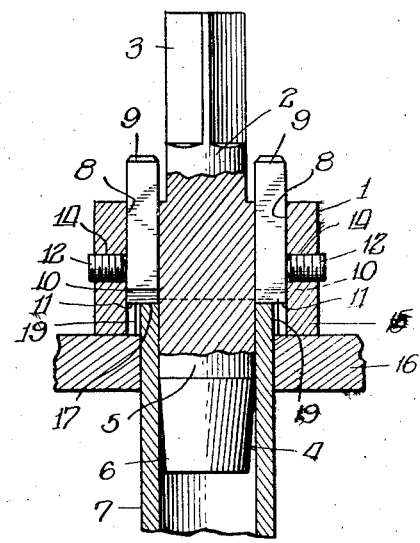
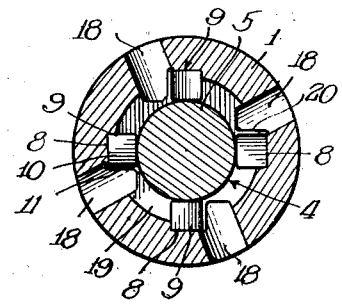
INVENTOR.
John A. Maples,
BY
Stone, Artman & Bisson,
ATTYS Patented Oct. 22, 1946

2,409,776

UNITED STATES PATENT OFFICE 2,409,776

JIG FOR TRIMMING BOILER TUBES

John A. Maples, Sturgeon Bay, Wis., assignor to Leathem D. Smith Shipbuilding Co., Sturgeon Bay, Wis., a corporation of Wisconsin Application October 18, 1943, Serial No. 506,715

3 Claims. (Cl. 29—105)

The present invention relates to jigs or similar device for machining, as trimming or cutting, the end of boiler tubes after they have been inserted through a boiler sheet or plate, and before the rolling or spinning of the ends of the tubes against the boiler sheet or plate.

When tubing a boiler, the tubes are inserted through the holes in the boiler sheet or plate with an end portion of the tubes extending or projecting beyond the surface of the plate. The protruding end portions will vary in length and will be more or less irregular or rough. It is desirable and essential that such protruding end portions of the tubes all be alike, that is, all of equal length, and also that the ends of the tubes be even and square, that is, at right angles to the axes of the tubes.

Among the objects of the invention is to provide a novel tool or jig for machining or trimming the protruding end portions of boiler tubes in a boiler sheet or plate to a definite and predetermined length, and to a properly and desired finished end form, for the later efficient rounding or spinning of the end portions of the tubes. It comprises a chuck for holding cutters for cutting or trimming the ends of the tubes, the cutters being adjustable in the chuck and adjustably set in adjusted position for the desired finished length of the protruding end portions of the tubes beyond the boiler sheet or plate. It also preferably has a gauge stop with reference to which the cutters are initially adjusted as desired, and which, when the cutting operation progresses, will contact or abut the boiler plate or sheet and thus automatically stop further cutting or trimming of the end portion of the tube and thus determine the desired length of the protruding end portion of the tube.

A further object of the invention is to provide a novel jig of the character described and which has a guiding arbor or spindle fitting into the tube to be cut, which arbor maintains the jig coaxial with the tube and the cutters square so that the end of the tube will be cut square or at a right angle to the axis of the tube.

Also, the invention comprises the provision of a novel means provided with openings adjacent the cutting locus for affording a free and direct escape of the chips or trimmings or cuttings to the exterior of the jig during the operation thereof.

Other objects, capabilities, advantages, features, and the like, are comprehended by the invention as will later appear and as are inherently possessed by the invention.

Referring briefly to the drawing:

Fig. 1 is a side view of a jig constructed in accordance with the invention;

Fig. 2 is an end view taken from a plane represented by line 2—2 in Fig. 1 of the drawing;

Fig. 3 is a transverse sectional view taken in a plane represented by line 3—3 in Fig. 1 of the drawing;

Fig. 4 is a longitudinal sectional view of the tool and a part of the tube and boiler plate at a starting stage of operation; and, Fig. 5 is a similar view showing the final stage of operation.

Referring more in detail to the drawing the particular embodiment chosen to illustrate the invention is shown as comprising a cylindrical body or chuck 1 having at an end thereof an axially extending rigid shank 2 provided with a coupling portion 3 which may be squared, fluted, or the like, for coupling to a portable driving unit (not shown) such as an air motor or an electric motor, or the like, an example of such a motor being that usually used for portable drills and the like. At the other end the chuck 1 has an axially extending rigid spindle or arbor 4 having a cylindrical body portion 5 adapted to fit and slide in an end portion of the boiler tube 7 so as to guide the jig or tool axially with respect to the tube 7, the spindle or arbor 4 also having a tapered end portion 6 for affording a facile entry of the spindle or arbor 4 into the end of the tube 7 when applying the tool or jig in place for trimming the end of the tube 7.

The body or chuck 1 also has a plurality of axially extending cutter sockets 8, arranged concentric with the axis of the tool or jig, for reception of cutters 9, these cutters being shown as square or rectangular in cross section and being provided at their forward ends with bevels 10 running to cutting edges 11. The cutters 9 are held in place by suitable setscrews 12, such as the type known as the Allen setscrews, having wrench sockets 13 (see Fig. 1), these setscrews being threaded into suitable radially extending threaded bores 14 provided in the sides of the chuck 1 and extending to the cutter sockets 8, so that the setscrews may bind against the sides of the cutters 9 and hold them in adjusted and selected position.

At the forward end of the chuck 1 is provided a flange 15 which acts as a gauge stop when it contacts the boiler plate or sheet 16 (see Fig. 5) so as to stop the cutting or the trimming of the end 17 of the boiler tube 7 (see Fig. 5) at the gauged distance, for the later rolling or spinning of the end 17 of the tube 7.

As the tool is rotated or turned about its axis the cutting edges 11 of the cutters 9 will cut chips or shavings or cuttings or the like from the end of the tube 7, and for the purpose of affording a free escape of these cuttings the flange portion 15 is provided with radially extending escape passages 18 communicating with the annular space 19 between the arbor 14 and the flange 15 and at or adjacent the cutting ends of the cutters 9 and with the exterior of the flange 15, so that the cuttings will be free to move through the escape passages 18 directly from the cutting loci to the exterior of the chuck 1. The inner ends 20 of the passages 18 intersect the forward end of the chuck 1 adjacent to the cutter sockets 8 and at the inner or rear end of the annular chamber 19 where the forward ends of the cutter sockets 8 terminate.

In use the cutters 9 are first adjusted in the chuck 1 so that the cutting edges 11 will be at a given or predetermined distance from the forward end of the gauge stop 15. This distance will be equal to the desired length of the end 17 of the tube 7 (see Fig 5) beyond the boiler plate 16 when the end of the tube has been cut or trimmed to the point when the gauge stop 15 contacts the boiler plate 16. The setscrews 12 are then set against the cutters 9.

In operation the jig is coupled to a suitable driving motor, and, being portable, the arbor 4 is introduced into the protruding end 17 of a boiler tube 7, as shown in Fig. 4. The cutters 9 are thus in contact with the end 17 of the boiler tube 7 as shown in Fig. 4. The cutting edges 11 of the cutters 9 are maintained at a normal, that is, at right angles, to the tube 7 by reason of the cylindrical portion 5 of the arbor fitting closely in the tube 7 and being coaxial therewith.

The operator presses the tool forwardly against the end of the tube 7, and closes the circuit of the driving motor, so that the tool is caused to revolve about the axis of the tool and of the tube 7 to trim or cut off chips or like cuttings from the end of the tube 7. When the tool has progressed in its cutting or trimming operation to the point when the gauge stop 15 contacts or abuts against the boiler sheet or plate 16, further cutting of the tube is prevented, even though the tool may continue to rotate. The cut end of the tube 7 is square, that is, at right angles to the axis of the tube 7, and the length of the tube end 17 is that of the desired and given magnitude for a proper later rolling or spinning of the tube end 17 against the boiler sheet or plate 16.

By the present invention, after the cutters 9 have been initially set for a given distance, as explained above, the amount of stock left at the end of the tube 7, beyond the plate 16, is controlled automatically. With this device it has been found that when tubing a boiler having approximately 1600 tubes, there is a saving of about 300 man hours of labor, over the work and time required by other existing and known operations. Also, the tool automatically clears itself of the chips and the other cuttings or trimmings as fast as they are produced.

While I have herein described and upon the drawing shown an illustrated embodiment of the invention it is to be understood that the invention is not limited thereto but comprehends other constructions, details, arrangements of parts, features, and the like, without departing from the spirit of the invention.

Having thus disclosed the invention, I claim:

1. A jig for trimming the end of a boiler tube projecting through a boiler plate comprising a cylindrical casting having upper and lower end faces and having a coaxial arbor extending from the lower end face, said arbor having a substantially smaller diameter than the lower face and a slightly smaller diameter than the inside diameter of the boiler tube to be trimmed, an annular recess in the lower end face adjacent the arbor resultantly forming a downwardly directed annular flange therearound, a socket in the casting parallel with the jig axis and opening into the recess, and a cutter adjustably mounted in said socket.

2. A jig for trimming the end of a boiler tube projecting through a boiler plate comprising a cylindrical casting having upper and lower end faces and having a coaxial arbor extending from the lower end face, said arbor having a substantially smaller diameter than the lower face and a slightly smaller diameter than the inside diameter of the boiler tube to be trimmed, an annular recess in the lower end face adjacent the arbor resultantly forming a downwardly directed annular flange therearound, a socket in the casting parallel with the axis of the jig and opening into said recess, a cutter mounted in said socket so that its cutting edge is inside the recess, and an opening through the wall of the casting into the recess adjacent the cutting edge of the cutter.

3. A jig for trimming the end of a boiler tube projecting through a boiler plate comprising a cylindrical casting having upper and lower end faces and having a coaxial arbor extending from the lower end face, said arbor having a substantially smaller diameter than the lower face and a slightly smaller diameter than the inside diameter of the boiler tube to be trimmed, an annular recess in the lower end face adjacent the arbor resultantly forming a downwardly directed annular flange therearound, a plurality of passageways in said casting parallel to the axis of the jig and extending from the upper end face through to the recess, elongated cutters disposed in said passageways with the cutting edges in the annular recess, means for holding each cutter against axial movement, and openings through the casting into the recess adjacent each cutting edge whereby chips may escape from the recess.

JOHN A. MAPLES.